United States Patent [19]

Ernst et al.

[11] 4,119,187
[45] Oct. 10, 1978

[54] CLUTCH RELEASE DEVICE

[75] Inventors: Horst Manfred Ernst, Eltingshausen; Armin Olschewski, Schweinfurt; Rainer Schürger, Schwanfeld; Lothar Walter, Schweinfurt; Manfred Brandenstein, Aschfeld; Erich Burkl, Stammheim, all of Fed. Rep. of Germany

[73] Assignee: SKF Industrial Trading & Development Company B.V., Nieuwegein, Netherlands

[21] Appl. No.: 746,942

[22] Filed: Dec. 2, 1976

[30] Foreign Application Priority Data

Dec. 12, 1975 [DE] Fed. Rep. of Germany ... 7539627[U]

[51] Int. Cl.$^2$ .................. F16D 23/00; F16D 13/60
[52] U.S. Cl. ................................. 192/98; 192/110 B
[58] Field of Search ......................... 192/98, 110 B

[56] References Cited

U.S. PATENT DOCUMENTS

| 3,317,014 | 5/1967 | Pitner | 192/98 |
| 3,963,106 | 6/1976 | Ernst et al. | 192/98 |
| 4,013,327 | 3/1977 | Kunkel et al. | 192/98 X |
| 4,026,399 | 5/1977 | Ladin | 192/98 |

Primary Examiner—Leonard H. Gerin
Attorney, Agent, or Firm—Daniel M. Rosen

[57] ABSTRACT

A clutch release device for use with a thrust bearing has a sliding sleeve formed as a cylinder with a flange extending radially outward, and a transition shoulder between the cylinder and flange; a radially extending reference plane extends through said shoulder, and said flange has portions thereof displaced axially, with said reference plane being equidistant from said flange and said displaced portions.

14 Claims, 5 Drawing Figures

CLUTCH RELEASE DEVICE

BACKGROUND OF THE INVENTION

The present invention relates to a clutch release device including a sliding sleeve, particularly for motor vehicles; the sliding sleeve is made of sheet metal, and has a radial flange with opposite sides. One side faces the clutch and has contact surfaces for a radially displaceable clutch thrust bearing; the other side faces away from the clutch, and has contact surfaces for a clutch lever.

Such clutch release devices are already known in the art, and are disclosed, for example, in U.S. Pat. No. 3,963,106, Ernst et al, assigned to the assignee of the present application and have proven well in application. However, it was found that in the manufacture of sliding sleeves of sheet metal, with the contact surfaces for the clutch lever and for the clutch thrust bearing relatively far apart, the stress on the sheet metal is great, and that cracks may easily develop at the transition points between the flange and the cylindrical part.

It is therefore the object of the present invention to provide a sliding sleeve for a clutch release device of the above-described type, in such a way that any axial spacing, required between the contact surfaces of the clutch lever and the clutch thrust bearing to attain great freedom for the clutch lever, can be provided with ease and without overstressing the material. It is a further feature that the contact surfaces of the sliding sleeve must have great stiffness in the axial direction.

SUMMARY OF THE INVENTION

According to the present invention, the sliding sleeve is provided with a shoulder transition area between a cylindrical section and a radially extending flange. Displaced from the flange in the axial direction are contact surfaces distributed on the circumference thereof; a radial plane is defined through the shoulder, this plane being axially mid-way between said flange and said axially displaced contact surfaces. In another embodiment of the present invention, the sliding sleeve has two parts; accordingly, a first sleeve has a cylindrical part, and secured in the bore thereof, there is an additional sleeve having a circumferential shoulder with a radially extending flange which rests against a contact surface of the first sliding sleeve.

Other characteristics and advantages of the present invention will be found in the following description of three embodiments which are shown in the drawings.

DETAILED DESCRIPTION OF THE PREFERRED EMBODIMENTS

Figure 1:
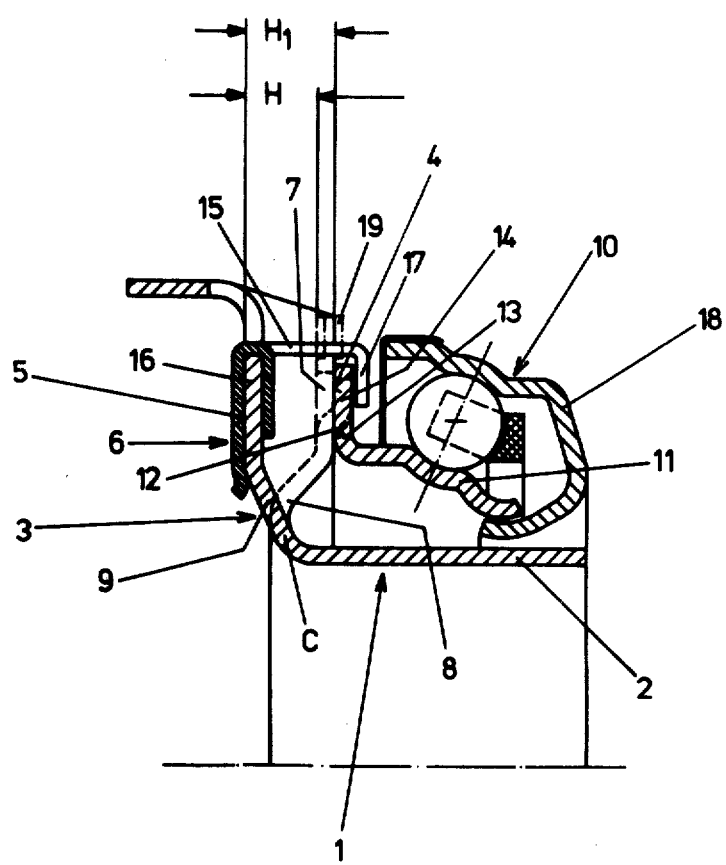
FIG. 1 shows in cross-section, a first embodiment of a clutch release device with a one-piece sliding sleeve whose flange is directed radially outward.
Figure 2:
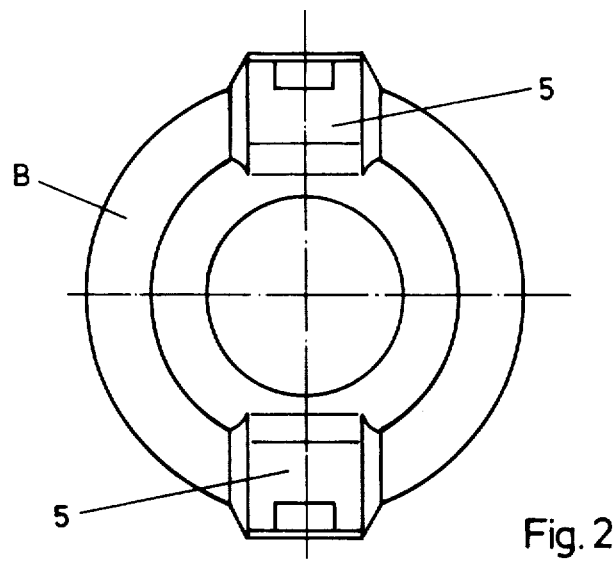
FIG. 2 shows an end view of the sliding sleeve taken from the left-hand side of FIG. 1.

The sliding sleeve 1, shown in FIGS. 1 and 2, comprises a cylindrical section 2 and a flange 3 directed radially outward. Flange 3 has contact surfaces 4 for the clutch thrust bearing and contact surfaces 5 for clip (or clasp, or bracket) 6 which has a hardened contact surface for the clutch lever (not shown). Contact surface 5 is displaced in the axial direction by an amount $H_1$ from contact surface 4, so that the required freedom for the clutch lever is assured and the contact surfaces 4, 5 have great axial stiffness.

The sliding sleeve 1 may be drawn with a flange section 7 which has a circumferential shoulder 8; then the section of the flange part with the contact surfaces 5 is pushed or displaced axially by an amount H. Alternatively, the sliding sleeve may be drawn with an outwardly extending flange section 9; then the region denoted in FIG. 2 by B is displaced axially by an amount H towards the clutch thrust bearing 10. In region C of the sliding sleeve 1, there is no stretch stress, so that no cracks can occur. By this design, the required height $H_1$ is easily attained without the material being overstressed during the drawing process.

The sliding sleeve 1 may be drawn, for example, with a straight radially outward extending flange section 9, and the part designated by B pushed or displaced axially in the direction of the clutch thrust bearing 10; then the region B is pressed or displaced axially to and through the radial plane passing through shoulder 8, which plane is virtually a neutral zone. A material upsetting takes place by a drawing or stretching of the material only axially beyond the neutral zone. Of course, it is also possible to press or displace the contact surfaces 4 from the neutral zone into an axial direction and to displace the other contact surfaces 5 from the neutral zone into the other axial direction.

The inside ring 11 of the clutch thrust bearing rests with a radially outward flange 12 on contact surfaces 4. To prevent the clutch thrust bearing 10 from rotating, the flange 12 has one or more recesses 13 which engage tabs 14 which are displaced from flange section 7 of the sliding sleeve 1. The clutch thrust bearing 10 is connected to the sliding sleeve 1 through two U-shaped clips 6 which are secured to portion 16 of the flange section 9; from each clip there extends projection 15 with its angled tab 17 adjacent flange 12 of inside ring 11 with a space therebetween for play. So that all parts of the clutch thrust bearing 10 and the sliding sleeve 1 constitute an integral unit, the outside ring 18 encircles the inside ring with play provided therebetween. Radial displacement of the clutch thrust bearing 10 is restricted by projections 19 which are formed as part of flange section 7.

Figure 3:
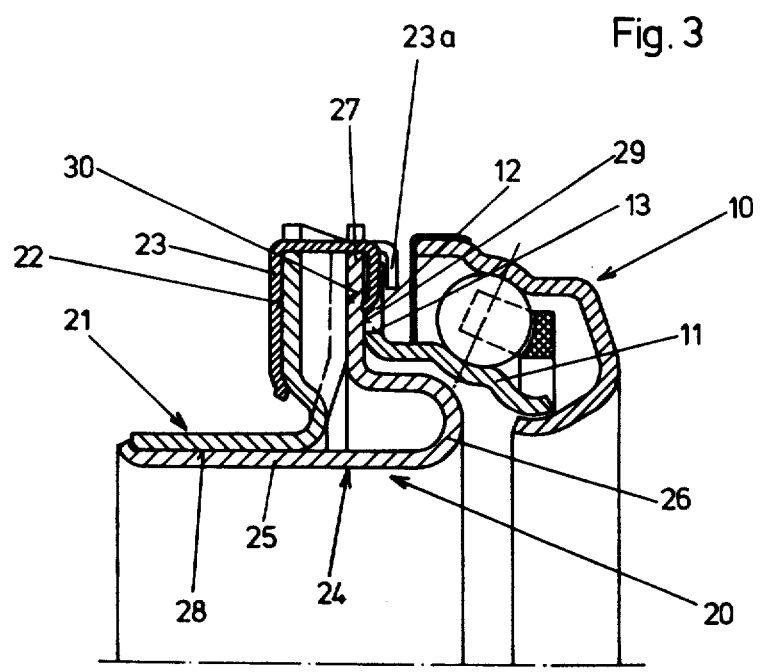
FIG. 3 shows in cross-section, a second embodiment of a clutch release device with a two-part sliding sleeve.

The construction shown in FIG. 3 differs from the embodiments of FIGS. 1 and 2 in that the sliding sleeve 20 is made of two parts, a sleeve 21 with contact surfaces 22 for the clip 23, and an additional sleeve 24. The additional sleeve 24 comprises a cylindrical portion 25, a peripheral shoulder 26 and a radially outward extending flange 27. The cylindrical portion 25 of the additional sleeve 24 fits into the bore 28 of sleeve 21 while flange 27 with the contact surface 29 for the clutch thrust bearing contacts surface 30. This produces a very stable sliding sleeve 20. The clips 23, which have a U-shaped cross-section, have one leg on the contact surface 22 of sleeve 21 and the other leg on the contact surface 29 of additional sleeve 24, with the second leg engaging a recess 13 of the fixed bearing ring 11. Furthermore, on clip 23 one or several tabs are provided; their radially inward angled portions 23a surround the flange 12 of the fixed bearing ring 11, with play.

Figure 4:
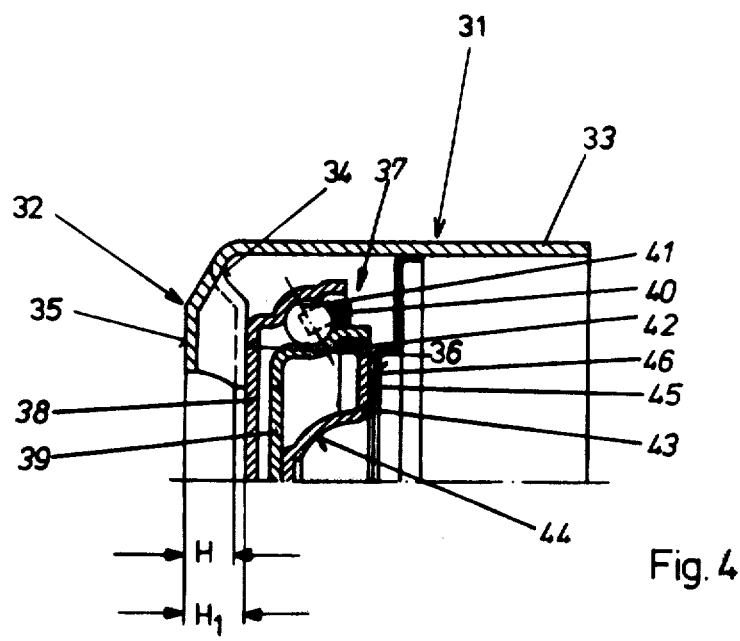
FIG. 4 shows in cross-section, a third embodiment of a clutch release device with one sliding sleeve which has a radially inward directed flange.
Figure 5:
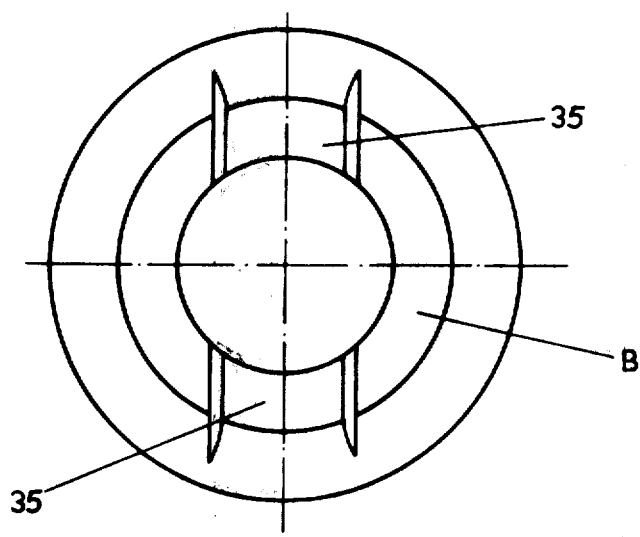
FIG. 5 shows an end view of the sliding sleeve taken from the left-hand side of FIG. 4.

FIGS. 4 and 5 show a sliding sleeve 31 with a radially inward flange 32. At the transition point between the cylindrical portion 33 and flange 32, the sliding sleeve 31 has a peripheral shoulder 34. From the flange 32, at a distance $H_1$ from the contact surfaces 35 for the clutch lever (not shown) portions B with contact surfaces 36 are formed; contact surfaces 35, 36 preferably are equidistant from a radial plane passing through the shoulder 34. Contact surfaces 36 face the clutch thrust bearing 37 (which is a pot bearing), and which can be displaced in the radial direction and is located in the cylindrical portion 33 of sliding sleeve 31. The clutch thrust bearing 37 comprises the fixed outside ring 38, the rotating inside ring 39 and the balls 41 located between bearing rings 38, 39 in a cage 40. Bore 42 of the inside ring 39 holds a bowl-shaped sheet metal part 43 which has a spherical indentation 44. This indentation 44 accommodates an actuator rod (not shown) which acts on the membrane spring of the clutch (not shown). The clutch thrust bearing 37 is held in the sliding sleeve 31 by the sheet metal disk 45; the bowl-shaped sheet metal part 43, which has a radial contact surface 46, contacts sheet metal disk 45 with play therebetween.

The embodiments described are only examples of a clutch release device in accordance with the present invention. Modifications of the construction of individual components within the scope of the present invention are easily possible.

What is claimed is:

1. In a clutch release device including a sliding sleeve cooperating with a thrust bearing having inner and outer rings, wherein said sleeve is formed from sheet metal and comprises a cylindrical portion with opposite first and second ends, a radially extending flange portion at said first end, said flange portion comprising at least one bearing contact section thereof axially displaced toward said second end of the sleeve and situated adjacent one of said thrust bearing rings for engaging said ring and a further radially extending section axially spaced from said bearing section for engaging a clutch lever; the improvement wherein said flange portion has a shoulder transition section between said cylindrical portion and said bearing contact and further sections, the radial planes of said bearing contact and further sections being displaced in opposite axial directions from said transition section.

2. A device according to claim 1, wherein said sleeve comprises a single piece of sheet metal, and there is defined through said shoulder transition section a radial reference plane located midway between said bearing contact section and said flange.

3. A device according to claim 2, wherein said flange portion has two of said displaced sections spaced 180° apart circumferentially.

4. A device according to claim 2, further comprising bracket means having a first part secured to said flange portion, and a second part engaging with axial play said thrust bearing ring adjacent said bearing contact section of the flange.

5. A device according to claim 2, further comprising means interconnecting said bearing contact section of the flange portion and said adjacent ring of the bearing, for preventing relative rotation therebetween.

6. A device according to claim 5, wherein said means for preventing relative rotation comprises a tab extending axially out of said bearing contact section and engaging said adjacent ring of the bearing.

7. A device according to claim 1, wherein said sleeve comprises a second cylinder portion radially inward of and secured to said first cylinder portion, with a second flange extending radially from said second cylinder portion and situated between and contacting said bearing contact section of the first mentioned flange portion and said ring of the thrust bearing adjacent said bearing contact section.

8. A device according to claim 7, further comprising connection means having a first part secured to said flange portions and a second part engaging with axial play said adjacent ring of the bearing.

9. A device according to claim 8, wherein said second part of the connection means further comprises a tab extending axially therefrom for engaging said adjacent ring of the bearing and preventing rotation of said ring relative to said flange portion.

10. A device according to claim 1, wherein said sleeve further comprises a second radially extending flange portion axially spaced from the first mentioned flange portion with said thrust bearing being situated between these portions which restrict axial movement of the bearing in both directions.

11. A device according to claim 10, further comprising a bowl-shaped member co-axial with said bearing and fixed to said thrust bearing ring adjacent said second flange portion and situated adjacent said second flange portion with play therebetween.

12. The device of claim 1, wherein said transition section is rounded.

13. The device of claim 1, wherein said shoulder transition section defines a neutral radially extending zone, the radial planes of said bearing contact and further planes being spaced from opposite sides of said neutral zone.

14. The device of claim 13, wherein said radial planes of said bearing contact and further sections are equally spaced from said neutral zone.

* * * * *